(12) United States Patent
Iwasaki

(10) Patent No.: US 6,934,465 B1
(45) Date of Patent: Aug. 23, 2005

(54) AUDIO AND/OR VIDEO DATA RECORDING AND REPRODUCING APPARATUS AND METHOD OF SAME

(75) Inventor: Yasuo Iwasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/826,744

(22) Filed: Apr. 7, 1997

(30) Foreign Application Priority Data

Apr. 8, 1996 (JP) .......................................... P8-085102

(51) Int. Cl.⁷ ............................................... H04N 5/52
(52) U.S. Cl. ......................... 386/98; 386/52; 386/125
(58) Field of Search ........................... 386/96, 98, 102, 386/104, 105, 106, 124, 125; 360/32; 348/7, 13, 722, 723, 409.1, 410.1, 411.1, 412.1

(56) References Cited

U.S. PATENT DOCUMENTS

| | | | |
|---|---|---|---|
| 4,899,342 A | | 2/1990 | Potter et al. ............. 371/40.11 |
| 4,947,271 A | * | 8/1990 | Nakayama et al. ......... 360/19.1 |
| 5,202,979 A | | 4/1993 | Hillis et al. ............. 395/182.04 |
| 5,684,784 A | | 11/1997 | Iwasaki et al. ............. 369/124 |
| 5,754,730 A | * | 5/1998 | Windrem et al. ........... 386/124 |
| 5,790,177 A | * | 8/1998 | Kassatly ....................... 348/13 |
| 5,841,941 A | * | 11/1998 | Morimoto et al. .......... 386/124 |

OTHER PUBLICATIONS

D. Patterson et al., "A Case for Redundant Arrays of Inexpensive Disks (RAID)," FIACM SIGMOD Conference, Chicago, Jun. 1–3, 1988, pp. 109–115.

J. Smith, "Recovery from Transient Faults in Redundant Systems," IBM Technical Disclosure Bulletin, vol. 23, No. 4, Sep. 1980, pp. 1707–1709.

H. Boral et al., "Database Machines: An Idea Whose Time has Passed? A Critique of the Future of Database Machines," Database Machines Int'l. Workshop, Munich, Sep. 1993, pp. 166–187.

M. Kim, "Parallel Operation of Magnetic Disk Storage Device: Synchronized Disk Interleaving," Database Machines Fourth Int'l. Workshop, Bahamas, Mar. 1985, pp. 300–330.

* cited by examiner

*Primary Examiner*—Thai Tran
*Assistant Examiner*—Christopher Onuaku
(74) *Attorney, Agent, or Firm*—Bell, Boyd & Lloyd LLC

(57) ABSTRACT

An audio and/or video data recording and reproducing apparatus and method of the same to improve an efficiency of editing with respect to audio and/or video data. An audio and/or video editing apparatus 64 controls an audio and/or video data recording and reproducing apparatus 5 and makes this start the reproduction operation. A disk array controller 50 selects a disk device recording the channel of the audio and/or video data for which the reproduction is requested, changes the hard disk drive made to perform the reproduction operation in accordance with the existence of an obstacle, reproduces the audio and/or video data, multiplexes the same with status data indicating the state of parts of the audio and/or video data recording and reproducing apparatus 5, generates a data stream physically adapted to SMPTE-259M, and outputs this to an audio and/or video editing apparatus 64.

12 Claims, 11 Drawing Sheets

3

# AUDIO AND/OR VIDEO DATA RECORDING AND REPRODUCING APPARATUS AND METHOD OF SAME

BACKGROUND OF THE INVENTION

1. Field of the Invention

The present invention relates to an audio and/or video data recording and reproducing apparatus for recording audio and/or video data in a recording apparatus capable of performing random access such as a hard disk drive and for reproducing the recorded audio and/or video data and to a method of the same.

2. Description of the Related Art

Recording apparatuses (hard disk array apparatuses) comprised of a plurality of hard disk drives which are connected in parallel, able to be randomly accessed, and in addition having a very large recording capacity have recently been commercialized.

To edit audio data and video data or one of the same (audio and/or video data) of a digital format, it is convenient to record the audio and/or video data in the above hard disk array apparatus and reproduce the desired part of the audio and/or video data for the editing rather than record the audio and/or video data on a tape recording medium in which substantially only sequential access is possible.

However, the data rate of the audio and/or video data is usually high, i.e., about 30 Mbps, and therefore in order to record the audio and/or video data at a high speed and reproduce a desired part of the recorded audio and/or video data, it is necessary to make the access time to the recording medium as short as possible to perform the recording and reproduction with a high efficiency.

Further, for example, when engaging in complex editing such as connecting a large number of pieces of audio and/or video data to produce audio and/or video data for a long program, it is necessary to connect a plurality of recording apparatuses for the audio and/or video data. In order to connect a plurality of recording apparatuses for audio and/or video data, many cables become necessary, the arrangement of the apparatuses becomes difficult, and much cost is incurred. Further, the control of the recording and reproducing operation for each of the plurality of audio and/or video data is difficult, so high efficiency editing is difficult.

SUMMARY OF THE INVENTION

An object of the present invention is to to provide an audio and/or video data recording and reproducing apparatus capable of recording audio and/or video data in a recording apparatus to which random access is possible and of reproducing a desired part of the recorded audio and/or video data which is suitable for use for editing and a method of the same.

Further, another object of the present invention is to provide an audio and/or video data recording and reproducing apparatus with which the access time when recording and reproducing the audio and/or video data with respect to the recording medium to which random access is possible is made as short as possible and the audio and/or video data can be recorded and reproduced with a high efficiency and a method of same.

Further, still another object of the present invention is to provide an audio and/or video data recording and reproducing apparatus with which complex editing with respect to the audio and/or video data can be carried out with a high efficiency by connecting a plurality of apparatuses and in addition the physical connections such as cable connections can be reduced even in a case where a plurality of apparatuses are connected and a method of same.

To attain the above objects, the audio and/or video data recording and reproducing apparatus according to the present invention has a receiving means for receiving a data stream in which a plurality of audio data and video data or one of the same (audio and/or video data) are multiplexed in a predetermined order; a demultiplexing means for demultiplexing each of the audio and/or video data from the received data stream; a plurality of recording means for recording each of the demultiplexed plurality of audio and/or video data so that random access is possible; a reproducing means for reproducing the plurality of audio and/or video data respectively recorded in the plurality of recording means; and a multiplexing means for multiplexing the reproduced plurality of audio and/or video data in the predetermined order and generating the data stream.

Preferably, each of the plurality of recording means adopts a mirror configuration having a plurality of recording apparatuses for recording the same audio and/or video data.

Preferably, each of the plurality of recording means adopts an array configuration in which a plurality of recording apparatuses are connected in parallel.

Further, for example, this apparatus is constituted so that each of the plurality of recording means has two hard disk drives having the same configuration and so that a plurality of channels worth of audio and/or video data demultiplexed by the demultiplexing means are recorded in two recording apparatuses in parallel while performing back-up so that the recorded audio and/or video data will not be lost even in a case where a recording apparatus breaks down, thereby improving the reliability.

Further, the recording means used for the hard disk array apparatus, in which for example each of a plurality of recording means is constituted by a plurality of hard disks, is made hierarchical so that the recording capacity of the audio and/or video data is made larger.

The reproducing means reproduces the audio and/or video data recorded on the hard disks by the recording means.

The multiplexing means multiplexes the plurality of audio and/or video data reproduced by the reproducing means in the original order corresponding to the plurality of channels to generate a data stream complying with the SMPTE (Society of Motion Picture and Television Engineers)-259M and transmits the same.

Further, for example, this apparatus is constituted so that the control data for instructing the contents of the recording and reproduction processing by the editing apparatus is multiplexed in the data stream and supplied to a plurality of audio and/or video data recording and reproducing apparatuses according to the present invention. The recording means and reproducing means of each audio and/or video data recording and reproducing apparatus operate in synchronization with a synchronization signal in the data stream, thereby to enable the transmission of the audio and/or video data and the control data by one transmission path with the editing apparatus to reduce the amount of cables, enable the control of the plurality of audio and/or video data recording and reproducing apparatuses from the editing apparatus, and further synchronize the audio and/or video data to be recorded and reproduced by each audio and/or video data recording and reproducing apparatus.

Further, the audio and/or video data recording and reproduction method according to the present invention comprises the steps of receiving a data stream in which a plurality of audio data and video data or one of the same (audio and/or video data) are multiplexed in a predetermined order; demultiplexing each of the audio and/or video data from the received data stream; recording each of the demultiplexed plurality of audio and/or video data so that random access is possible; reproducing the plurality of audio and/or video data respectively recorded in the plurality of recording means; and multiplexing the reproduced plurality of audio and/or video data in the predetermined order and generating the data stream.

BRIEF DESCRIPTION OF THE DRAWINGS

These and other objects and features of the present invention will become clearer from the following description of the preferred embodiments with reference to the attached drawings, in which.

DESCRIPTION OF THE PREFERRED EMBODIMENTS

First Embodiment

Below, an explanation will be made of a first embodiment of the present invention.

Figure 1:
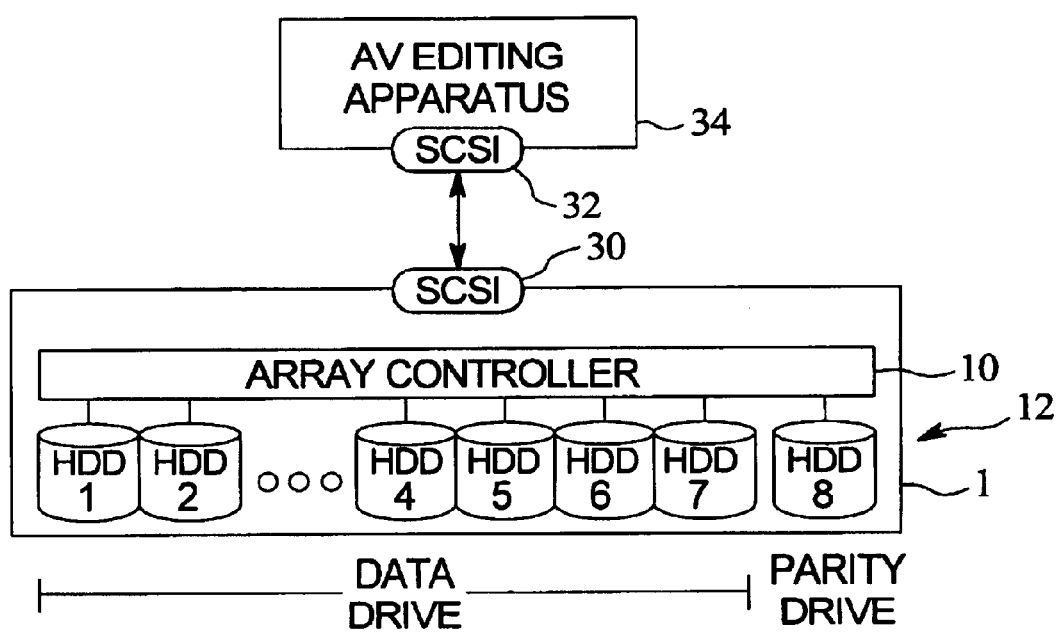
FIG. 1 is a view of the configuration of an audio and/or video editing system according to a first embodiment of the present invention.

FIG. 1 is a view of the configuration of an audio and/or video editing system 3 according to a first embodiment of the present invention.

As shown in FIG. 1, the audio and/or video editing system 3 is constituted by an audio and/or video data recording and reproducing apparatus 1, small computer system interface circuits (SCSI circuits) 30 and 32, and an audio and/or video editing apparatus (AV editing apparatus) 34.

Figure 2:
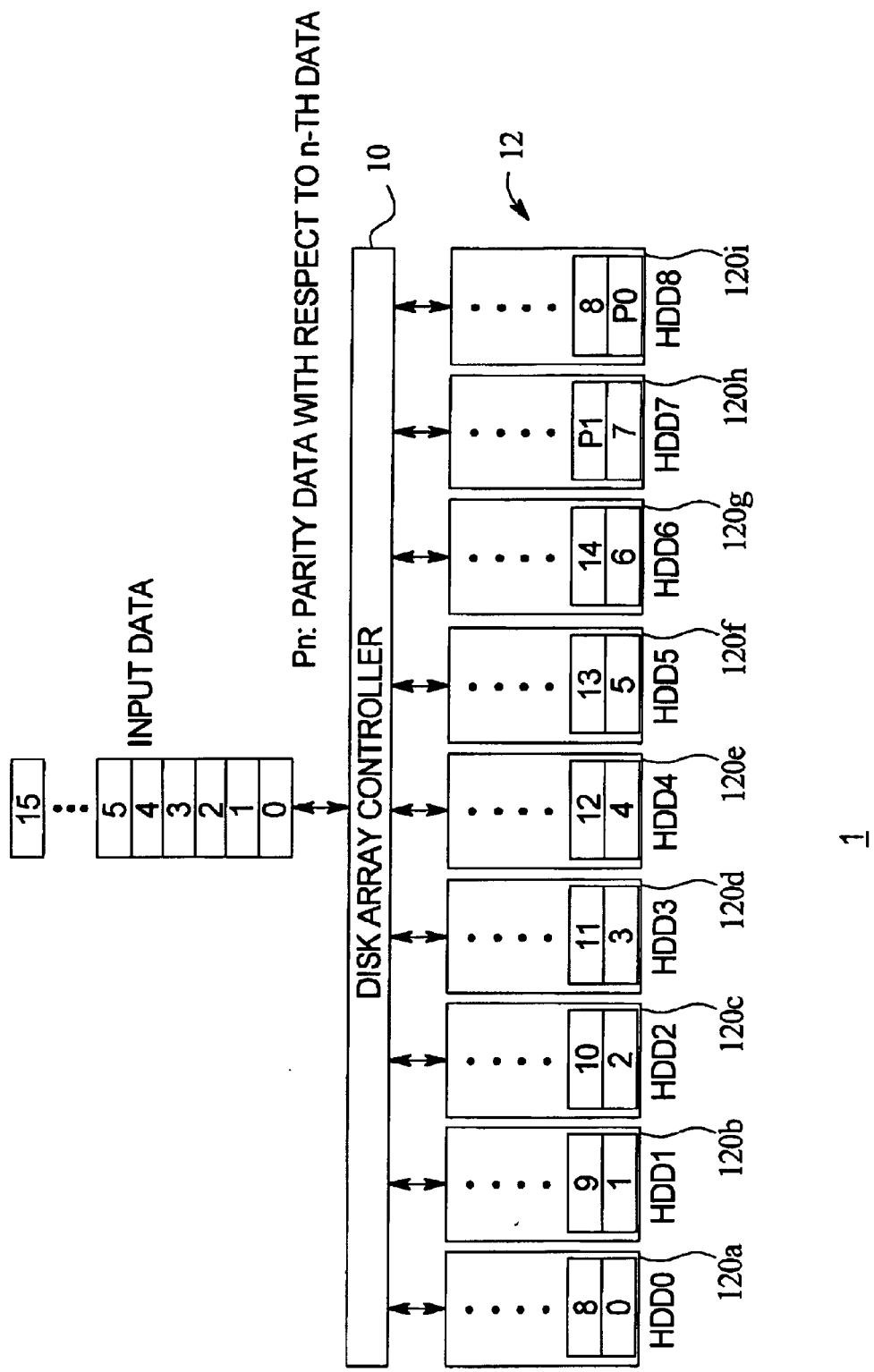
FIG. 2 is a view of the configuration of an audio and/or video data recording and reproducing apparatus shown in FIG. 1.

FIG. 2 is a view of the configuration of the audio and/or video data recording and reproducing apparatus 1 shown in FIG. 1.

As shown in FIG. 1 and FIG. 2, the audio and/or video data recording and reproducing apparatus 1 is constituted by a disk array controller 10 and a hard disk array 12. The hard disk array 12 is constituted by for example nine hard disk drives (HDD0 to HDD8) 120a to 120i.

In the audio and/or video editing system 3 (FIG. 1), the audio and/or video editing apparatus 34 controls the audio and/or video data recording and reproducing apparatus 1 via a control interface (not illustrated), makes the audio and/or video data recording and reproducing apparatus 1 reproduce the audio data and video data or one of the same (audio and/or video data), receives this via the SCSI circuits 30 and 32, and performs the editing, outputs the audio and/or video data after the editing to the audio and/or video data recording and reproducing apparatus 1, and makes the same record the audio and/or video data.

In the audio and/or video data recording and reproducing apparatus 1 (FIG. 2), the disk array controller 10 adds parity data Pn (n is an integer) to data blocks 0, 1, . . . of the audio and/or video data input from the audio and/or video editing apparatus 34 under the control of the audio and/or video editing apparatus 34 via the control interface, distributes the audio and/or video data to the hard disk drives 120a to 120h of the hard disk array 12, makes them record the audio and/or video data, and makes the hard disk drive 120i record the parity data Pn.

Further, the disk array controller 10 makes the hard disk drives 120a to 120i reproduce the data blocks of the audio and/or video data and the parity data thereof for which the reproduction is requested by the audio and/or video editing apparatus 34 via the control interface, performs the parity check, and outputs the same to the audio and/or video editing apparatus 34 via the SCSI circuits 30 and 32.

First, an explanation will be made of the operation when the audio and/or video data are recorded in the audio and/or video data recording and reproducing apparatus 1 at the audio and/or video editing system.

The audio and/or video editing apparatus 34 controls the audio and/or video data recording and reproducing apparatus 1 via the control interface and makes this start the recording operation. Further, the audio and/or video editing apparatus 34 sequentially outputs for example the data blocks 0, 1, . . . , 15 of the audio and/or video data which have been already edited to the audio and/or video data recording and reproducing apparatus 1 via the SCSI circuits 30 and 32.

The disk array controller 10 of the audio and/or video data recording and reproducing apparatus 1 sequentially generates the parity data Pn with respect to each of the input data blocks 0, 1, . . . , 15 of the audio and/or video data as shown in FIG. 2, distributes the data blocks 0 and 8 among the data blocks 0, 1, . . . , 15 to the hard disk drive 120a, distributes data blocks 1 and 9 to a hard disk drive 120b, distributes data blocks 2 and 10 to a hard disk drive 120c, distributes data blocks 3 and 11 to a hard disk drive 120d, distributes data blocks 4 and 12 to a hard disk drive 120e, distributes data blocks 5 and 13 to a hard disk drive 120f, distributes data blocks 6 and 14 to a hard disk drive 120g, distributes data blocks 7 and 15 to a hard disk drive 120h, and makes these hard disk drives record the same and makes the hard disk drive 120i record the generated parity data.

Next, an explanation will be made of the operation when the audio and/or video data are reproduced from the audio and/or video data recording and reproducing apparatus 1 in the audio and/or video editing system 3.

The audio and/or video editing apparatus 34 controls the audio and/or video data recording and reproducing apparatus 1 via the control interface and makes this start for example the reproduction operation of audio and/or video data.

The disk array controller 10 of the audio and/or video data recording and reproducing apparatus 1 controls the hard disk drives 120a and 120i and makes them sequentially reproduce the data blocks of the audio and/or video data and the parity data Pn thereof. Further, the disk array controller 10 performs a parity check with respect to the audio and/or video data by using the reproduced parity bit and outputs the same to the audio and/or video editing apparatus 34 via the SCSI circuits 30 and 32.

Note that, in actuality, the transfer data rate for each of the hard disk drives 120a to 120h is about 24 Mbps and the data rate of the audio and/or video data is 30 Mbps. In the audio and/or video editing system 3, the transfer of a maximum of six channels of the audio and/or video data [6≈192 Mbps (=24 Mbps×8)/30 Mbps] is possible between the audio and/or video editing apparatus 34 and the audio and/or video data recording and reproducing apparatus 1.

As explained above, in the audio and/or video editing system 3, the audio and/or video editing apparatus 34 performs the recording and reproduction of the audio and/or video data with respect to the hard disk array 12 of the audio and/or video data recording and reproducing apparatus 1 comprised of the hard disk drives connected in parallel. Accordingly, the editor can reproduce any desired part of the audio and/or video data by performing a random access to the hard disk array 12 by using the audio and/or video editing apparatus 34 and use the same for the editing and thereby perform the editing work with a high efficiency.

Further, as mentioned above, the transfer of a plurality of audio and/or video data is possible between the audio and/or video editing apparatus 34 and the audio and/or video data recording and reproducing apparatus 1, therefore the audio and/or video editing apparatus 34 can perform the editing by making the audio and/or video data recording and reproducing apparatus 1 supply a plurality of audio and/or video data and further can make the audio and/or video data recording and reproducing apparatus 1 record the already edited audio and/or video data therein.

Further, the hard disk array 12 is constituted by a plurality of hard disk drives and has a very large storage capacity (several gigabytes to several tens of gigabytes). Accordingly, the audio and/or video editing system 3 is preferred for connecting a large number of pieces of audio and/or video data to produce audio and/or video data of a long program.

Further, the hard disk array 12 of the audio and/or video data recording and reproducing apparatus 1 has the hard disk drives 120a to 120h for recording the audio and/or video data proper and the hard disk drive 120i for recording the parity data Pn. Accordingly, the hard disk array 12 of the audio and/or video data recording and reproducing apparatus 1 is preferred for the recording of the audio and/or video data to which parity is added and redundancy is given and so the reliability when recording and reproducing the audio and/or video data is high.

Note that it is also possible to constitute the audio and/or video data recording and reproducing apparatus 1 by using another recording and reproducing apparatus using a recording medium capable of recording and reproducing audio and/or video data so that random access is possible in place of the hard disk drives 120a to 120i, for example, a magneto-optical disk.

Further, it is also possible to use the audio and/or video editing system 3 for the editing of only one of the audio data and video data.

Second Embodiment

Below, an explanation will be made of a second embodiment of the present invention.

Figure 3:
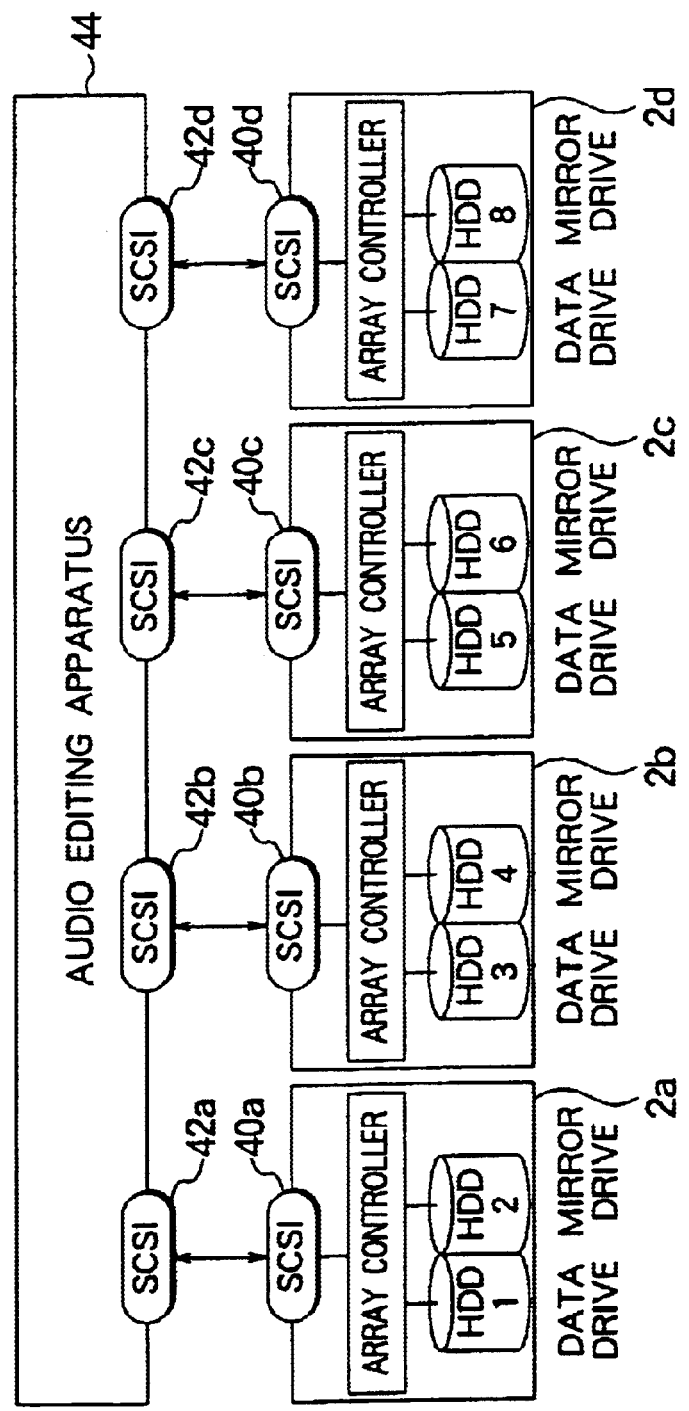
FIG. 3 is a view of the configuration of an audio editing system according to a second embodiment of the present invention.

FIG. 3 is a view of the configuration of an audio editing system 4 according to a second embodiment of the present invention.

As shown in FIG. 3, the audio editing system 4 according to the present invention is constituted by an audio editing apparatus 44, SCSI circuits 40a to 40d and 42a to 42d, and audio data recording and reproducing apparatuses 2a to 2d.

Figure 4:
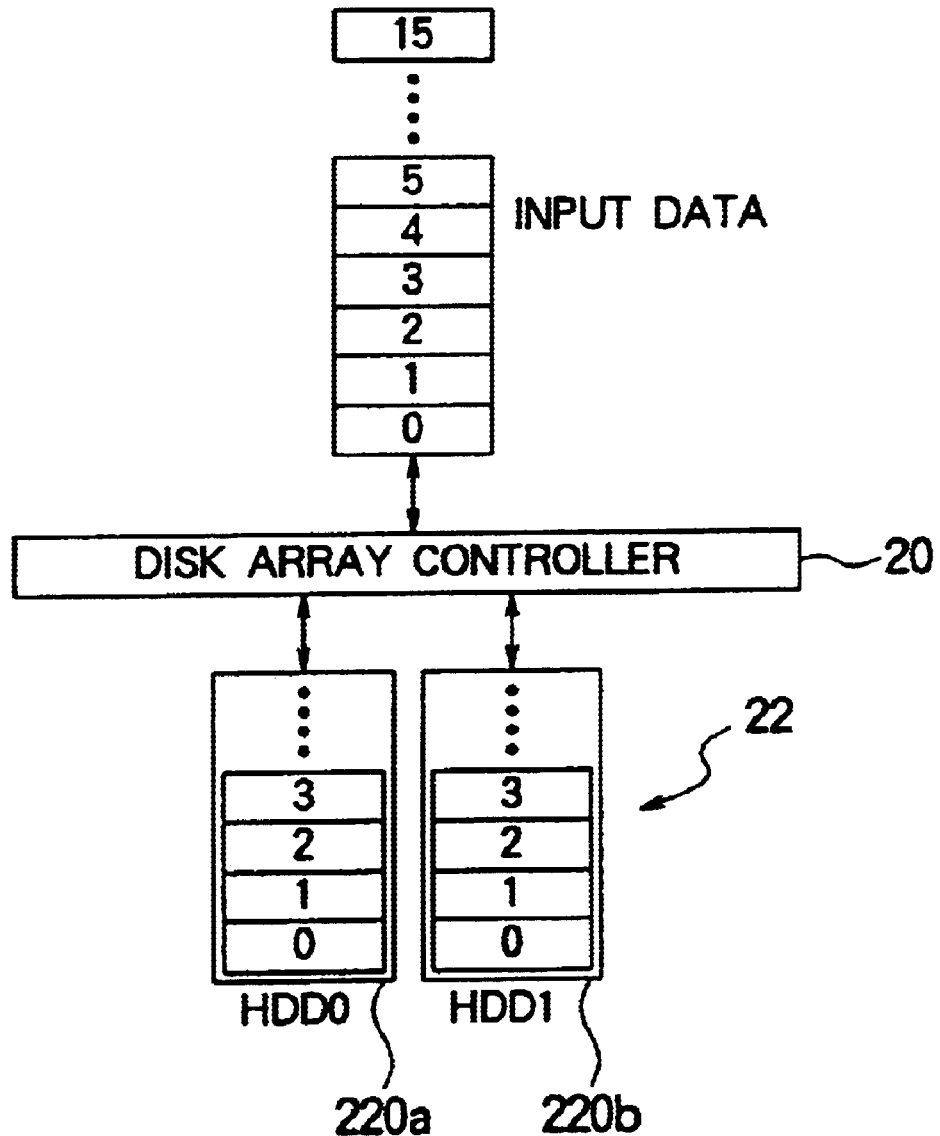
FIG. 4 is a view of the configuration of an audio data recording and reproducing apparatus shown in FIG. 3.

FIG. 4 is a view of the configuration of the audio data recording and reproducing apparatuses 2a to 2d shown in FIG. 3.

As shown in FIG. 4, each of the audio data recording and reproducing apparatuses 2a to 2d is constituted by a disk array controller 20 and a disk device 22 having a mirror configuration. The disk device 22 adopts a mirror configuration comprising the same hard disk drive 220a (data drive) and hard disk drive 220b (mirror drive).

In the audio editing system 4 (FIG. 3), the audio editing apparatus 44 controls for example four audio data recording and reproducing apparatuses 2a to 2d via a control interface (not illustrated), makes each of the audio data recording and reproducing apparatuses 2a to 2d reproduce the audio data, receives the same via the SCSI circuits 40a to 40d and 42a to 42d, performs the editing with respect to four channels worth of audio data in parallel, outputs the audio data after the editing to each of the audio data recording and reproducing apparatuses 2a to 2d, and makes them record the audio data.

In each of the audio data recording and reproducing apparatuses 2a to 2d (FIG. 4), the disk array controller 20 makes the hard disk drives 220a and 220b record the data blocks 0, 1, . . . of the audio data input from the audio editing apparatus 44 under the control of the audio editing apparatus 44 via the control interface. That is, the same audio data is recorded in the hard disk drives 220a and 220b.

Further, the disk array controller 20 makes the hard disk drive 220a reproduce the audio data for which the audio editing apparatus 44 requests reproduction via the control interface, performs a parity check, and outputs the audio data to the audio editing apparatus 44.

Further, the disk array controller 20 has a function of detecting situations (obstacle) where trouble or the like would make recording and reproduction of the audio data by the hard disk drives 220a and 220b impossible and after detecting that an obstacle is caused in the hard disk drive 220a, performs the recording and reproduction of the audio data by using the hard disk drive 220b. That is, the hard disk drives 220a and 220b of the audio data recording and reproducing apparatuses 2a to 2d form a complete duplex configuration.

First, an explanation will be made of the operation when recording the audio data in the audio data recording and reproducing apparatuses 2a to 2d in the audio editing system 4.

The audio editing apparatus 44 controls the audio data recording and reproducing apparatuses 2a to 2d via the control interface and makes them start the recording operation. Further, the audio editing apparatus 44 sequentially outputs for example the data blocks 0, 1, . . . , 15 of the audio data for which the editing has been performed via the SCSI circuits 40a to 40d and 42a to 42d to the audio data recording and reproducing apparatuses 2a to 2d.

The disk array controller 20 of the audio data recording and reproducing apparatuses 2a to 2d make the individual hard disk drives 220a and 220b sequentially record the data blocks 0, 1, . . . , 15 of the input audio data as shown in FIG. 4.

Next, an explanation will be made of the operation when reproducing the audio data from the audio data recording and reproducing apparatuses 2a to 2d in the audio editing system 4.

The audio editing apparatus 44 controls the audio data recording and reproducing apparatuses 2a to 2d via the control interface and makes them start for example the reproduction operation of the audio data.

The disk array controller 20 of the audio data recording and reproducing apparatuses 2a to 2d control the hard disk drive 220a, makes this sequentially reproduce the data blocks of the audio data, and outputs the same to the audio editing apparatus 44 via the SCSI circuits 40a to 40d and 42a to 42d.

Next, an explanation will be made of the operation of the audio data recording and reproducing apparatuses 2a to 2d where an obstacle occurs in one of the hard disk drives 220a and 220b.

Where it is detected that an obstacle has occurred in the hard disk drive 220a, the disk array controller 20 displays that the obstacle is caused in the hard disk drive 220a on for example a display device of the audio editing apparatus 44 or a display use lamp provided in the audio data recording and reproducing apparatuses 2a to 2d (both are not illustrated) and, at the same time, makes the hard disk drive 220b perform the reproduction of the audio data for which the reproduction is requested from the audio editing apparatus 44 after the detection of the obstacle of the hard disk drive 220a and outputs the reproduced data blocks to the audio editing apparatus 44.

When it is detected that the obstacle is caused in the hard disk drive 220b, the disk array controller 20 displays that the obstacle is caused in the hard disk drive 220b. Note, after the detection of the obstacle in the hard disk drive 220b, the hard disk drive 220a is made to perform the reproduction of the audio data requested from the audio editing apparatus 44 as it is and outputs the reproduced audio data to the audio editing apparatus 44.

As explained above, in the audio editing system 4, the audio editing apparatus 44 performs the recording and reproduction of the audio data with respect to the hard disk array 12 of the audio data recording and reproducing apparatuses 2a to 2d having a mirror configuration in which two hard disk drives 220a and 220b are connected in parallel. That is, the audio editing system 4 performs the reproduction of the audio data by using a recording apparatus adopting a complete duplex configuration, therefore has a high reliability and thus is suited to the purpose of continuously reproducing the audio data of a program for broadcast in for example a television station or radio station.

Further, the editor can randomly access the hard disk array 12 by using the audio editing apparatus 44, reproduce any desired part of the audio data, and use the same for the editing and therefore can perform the editing work with a high efficiency.

Further, the audio editing apparatus 44 can transfer a plurality of audio data in parallel with the audio data recording and reproducing apparatuses 2a to 2d and therefore can produce a plurality of channels worth of the audio data in parallel.

Note that, the audio editing system 4 can be modified by for example replacing the hard disk drive by a magneto-optical disk device or the like in the same way as the audio and/or video editing system 3 shown in the first embodiment.

Further, it is also possible to, for example, replace the audio editing apparatus 44 by a video editing apparatus or an audio and/or video editing apparatus, further replace the hard disk drives 220a and 220b by a hard disk array and thereby to increase the recording capacity, and make other modifications and apply the audio editing system 4 for the editing of audio and/or video data.

Third Embodiment

Below, a third embodiment of the present invention will be explained.

First, an explanation will be made of a problem of the audio and/or video editing system 3 shown in the first embodiment of the present invention and the audio editing system 4 shown in the second embodiment for indicating the background by which the third embodiment of the present invention was reached.

Figure 5:
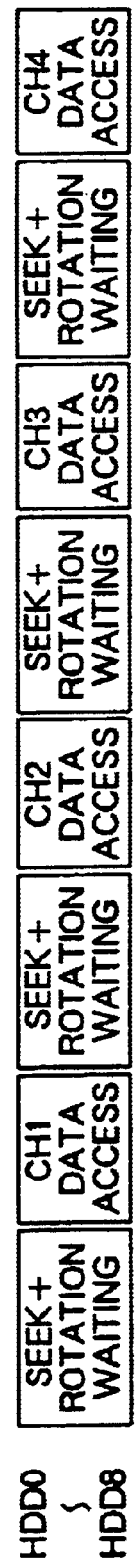
FIG. 5 is a view of an access timing when a hard disk array reproduces the audio and/or video data from a hard disk drive in the audio and/or video data editing system (FIG. 1) shown in the first embodiment.

FIG. 5 is a view of an access timing when the hard disk array 12 reproduces the audio and/or video data from the hard disk drives 120a to 120i in the audio and/or video editing system 3 (FIG. 1) shown in the first embodiment.

In the audio and/or video editing system 3 shown in the first embodiment, the audio and/or video editing apparatus 34 and the audio and/or video data recording and reproducing apparatus 1 are connected via the SCSI circuits 30 and 32, therefore the transfer rate of the audio and/or video data between them is limited by the data transfer capability of the SCSI circuits 30 and 32. At present, the transfer rate of the SCSI circuits 30 and 32 is about 160 Mbps, therefore, in actuality, the number of channels of the audio and/or video data which can be transferred in parallel between the audio and/or video editing apparatus 34 and the audio and/or video data recording and reproducing apparatus 1 becomes five or less ($\approx$160 Mbps/30 Mbps).

Further, for example, when the audio and/or video editing apparatus 34 tries to reproduce four channels worth of the audio and/or video data in parallel from the audio and/or video data recording and reproducing apparatus 1, in order to supply the four channels (CH1 to CH4) worth of audio and/or video data to the audio and/or video editing apparatus 34, the audio and/or video data recording and reproducing apparatus 1 must reproduce the four channels worth of the audio and/or video data in a time division manner. Accordingly, as shown in FIG. 5, whenever the hard disk drives 120a to 120i (HDD0 to HDD8) access a different channel of the audio and/or video data, a seek and rotation waiting time are produced, the access time become intermittent, and in addition the amount of the audio and/or video data read out at one time becomes small. That is, the time in which the hard disk drives 120a to 120i substantially access the four channels worth of audio and/or video data becomes shorter than that of the case where they access one channel worth of the audio and/or video data.

Further, where requests for recording and reproducing a plurality of channels worth of the audio and/or video data simultaneously occur, a discontinuity is caused in the audio and/or video data recorded and reproduced by the hard disk drives 120a to 120i, the recording and reproduction of the audio and/or video data in real time becomes difficult, and the continuous recording and reproduction of the audio and/or video data of a moving picture becomes difficult.

In order to deal with such a problem, there is also a method for controlling the SCSI circuits 30 and 32 so as to use the plurality of channels of audio and/or video data in a time division manner by dividing a predetermined cycle into a plurality of time slots.

However, when considering the possibility that the hard disk drives 120a to 120i will access the audio and/or video data a plurality of times in each of the time slots allocated to the plurality of channels, it is necessary to take measures to extend the length of the time slot or raise the speed of the hard disk drives 120a to 120i in advance. When taking the former measure, the cycle of finishing the round of reproduction of all of the channels of the audio and/or video data becomes long and the response of the reproduction operation of each channel of the audio and/or video data is lowered. On the other hand, when adopting the latter measure, there arises a necessity of making the storage capacity of the buffer memory for buffering each channel of the audio and/or video data for every time slot large, which leads to a rise of costs of the audio and/or video editing system.

Here, where the audio editing system 4 (FIG. 3) shown in the second embodiment is modified as explained above and used for the purpose of performing the editing for a plurality of channels of the audio and/or video data in parallel, the seek time and rotation waiting time are independently produced in each of the hard disk drives 220a and 220b of the audio data recording and reproducing apparatuses 2a to 2d. Accordingly, if the configuration of the audio editing system 4 is adopted, the problem caused in the audio and/or video editing system 3 shown in the first embodiment can be solved.

However, the audio editing device 44 and the audio data recording and reproducing apparatuses 2a to 2d are connected by general SCSI circuits 40a to 40d and 42a to 42d, therefore a communication interface circuit, connection cable, and communication software (control interface) necessary for the communication of control data between the audio editing device 44 and the audio data recording and reproducing apparatuses 2a to 2d become separately necessary for the two.

That is, in the audio editing system 4, twice the number of the audio data recording and reproducing apparatuses 2a to 2d of the control interfaces becomes necessary in total, which becomes a cause preventing the reduction of size and lowering of costs of the audio editing system 4.

For the reduction of size and lowering of costs of the audio editing system 4, in the audio editing system 4, the measure of connecting the audio data recording and reproducing apparatuses 2a to 2d in the form of a daisy chain and reducing the control interfaces of the audio editing apparatus 44 to only one system can be considered. However, when constituting the audio editing system 4 in this way, the control processing between the audio editing apparatus 44 and the audio data recording and reproducing apparatuses 2a to 2d become complex, and the configuration of the audio data recording and reproducing apparatuses 2a to 2d cannot be simplified more than this.

The third embodiment of the present invention was made so as to solve the problem of the audio and/or video editing system 3 (FIG. 1) and the audio editing system 4 (FIG. 3) explained above and has as an object thereof to provide an audio and/or video data recording and reproducing apparatus capable of recording and reproducing a plurality of channels worth of the audio and/or video data with a high efficiency.

Further, another object of the third embodiment of the present invention is to provide an audio and/or video data recording and reproducing apparatus in which the control processing between the audio and/or video editing apparatus and the audio and/or video data recording and reproducing apparatus is simplified and in addition the configuration of the apparatus is simple.

Figure 6:
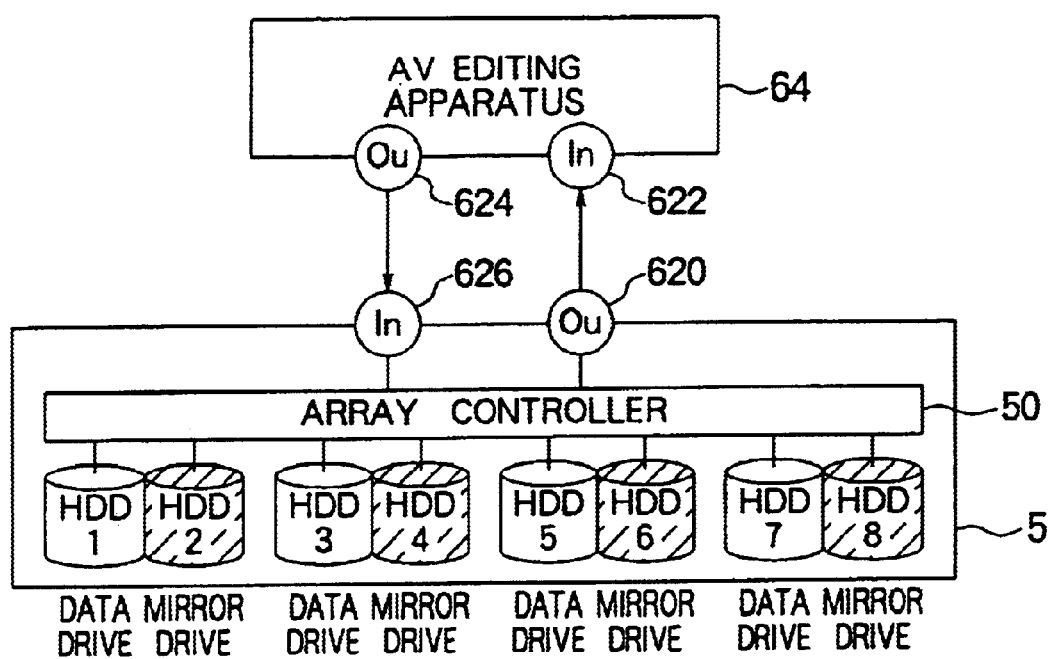
FIG. 6 is a view of the configuration of the audio and/or video editing system in a third embodiment.

FIG. 6 is a view of the configuration of an audio and/or video editing system 6 in the third embodiment.

As shown in FIG. 6, the audio and/or video editing system 6 is constituted by an audio and/or video data recording and reproducing apparatus 5, an audio and/or video editing apparatus 64, parallel/serial conversion circuits (P/S circuits) 620 and 624, and serial/parallel conversion circuits (S/P circuits) 622 and 626.

Figure 7:
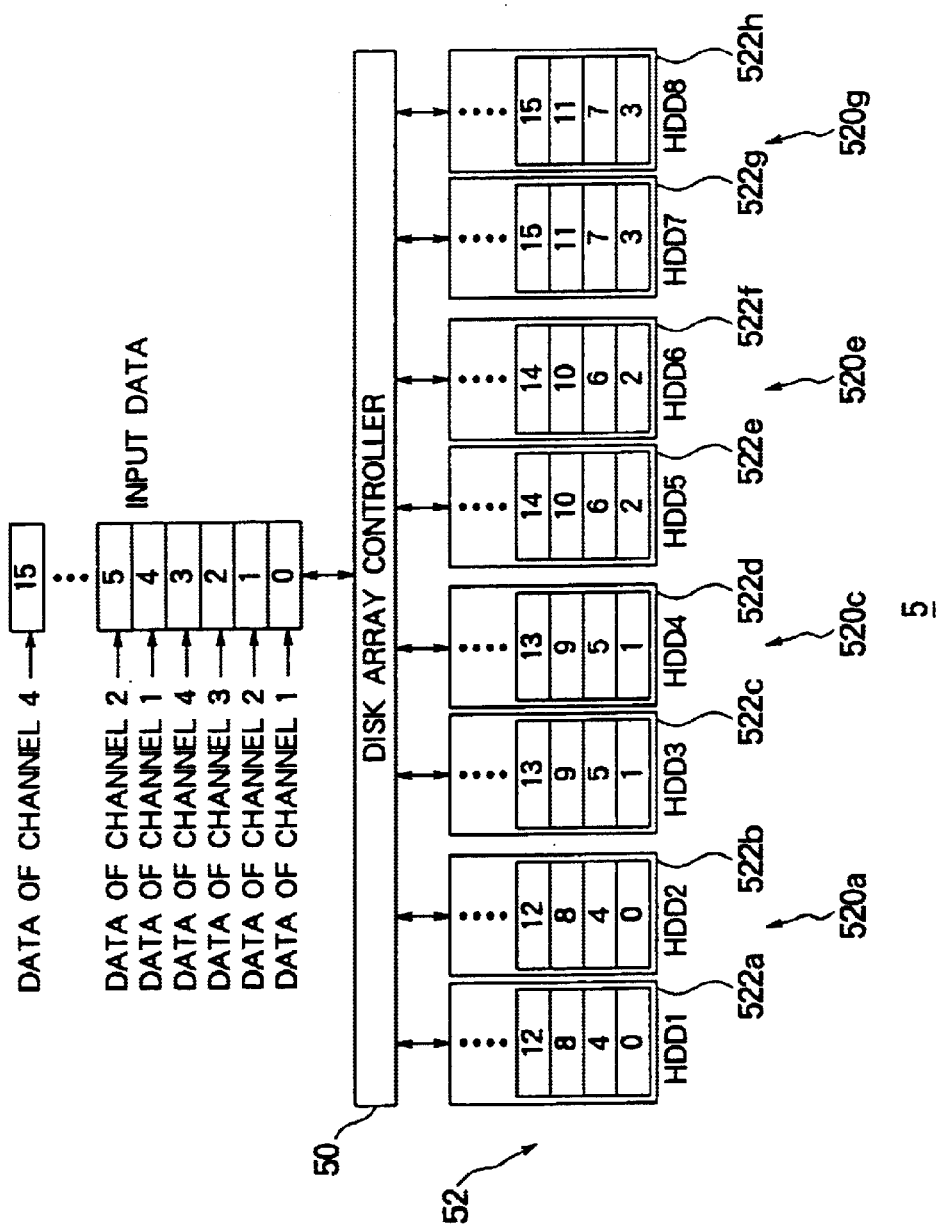
FIG. 7 is a schematic view of the configuration and operation of the audio and/or video data recording and reproducing apparatus shown in FIG. 6.
Figure 8:
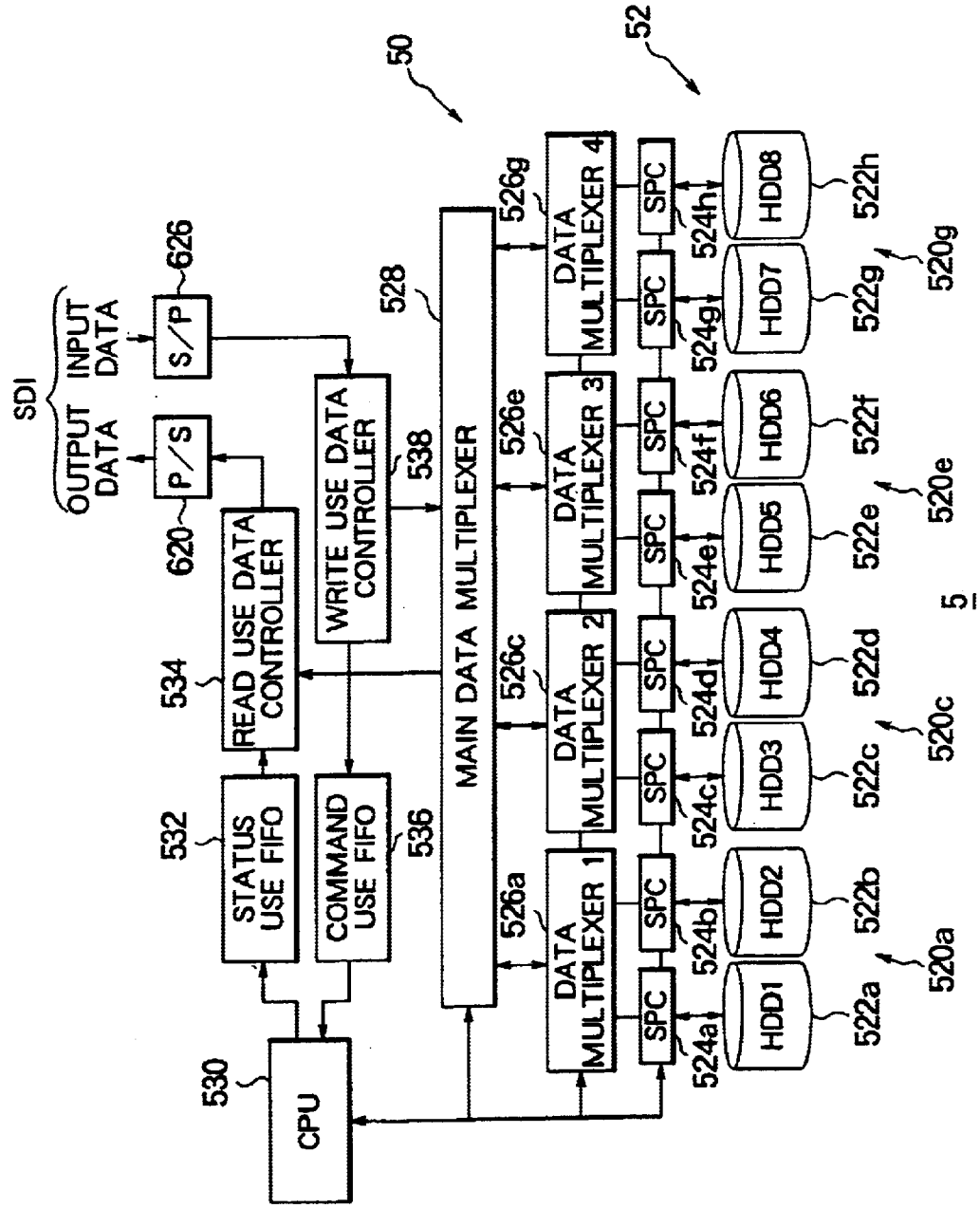
FIG. 8 is a view of a detailed configuration of the audio and/or video data recording and reproducing apparatus shown in FIG. 6.

FIG. 7 is a schematic view of the configuration and operation of the audio and/or video data recording and reproducing apparatus 5 shown in FIG. 6; and FIG. 8 is a view of a detailed configuration of the audio and/or video data recording and reproducing apparatus 5 shown in FIG. 6.

As shown in FIG. 7, the audio and/or video data recording and reproducing apparatus 5 is constituted by a disk array controller 50 and a hard disk array 52 similar to the audio and/or video data recording and reproducing apparatus 1 (FIG. 2). The hard disk array 52 is constituted by eight hard disk drives 522a to 522h.

Further, the hard disk drives 522a and 522b constitute the disk device 520a of a mirror configuration similar to the disk device 22 (FIG. 4), the hard disk drives 522c and 522d constitute a disk device 520c of a mirror configuration, the hard disk drives 522e and 522f constitute a disk device 520e of a mirror configuration, and the hard disk drives 522g and 522h constitute a disk device 520g of a mirror configuration.

Further, as shown in FIG. 8, the disk array controller 50 is constituted by SPC (SCSI protocol controller) circuits 524a to 524h, data multiplexers 526a, 526c, 526e, and 526g, a main data multiplexer 528, a microprocessor (CPU), a control unit 530 comprising a memory circuit and peripheral circuits of the same, a status use FIFO 532, a read use data controller 534, a command use FIFO 536, and a write use data controller 538.

In the audio and/or video editing system 6 (FIG. 6), the audio and/or video editing apparatus 64 and the audio and/or video data recording and reproducing apparatus 5 are connected via a transmission path for serially transmitting a data stream with the same transmission rate (270 Mbps) as that of for example the SDI (SMPTE-259M) vis the P/S circuits 620 and 624 and S/P circuits 622 and 626. Note that, it is also possible to constitute the P/S circuits 620 and 624 and S/P circuits 622 and 626 by using the parallel/serial conversion semiconductor device and serial/parallel conversion semiconductor device developed for the SDI system, respectively.

Figure 9:
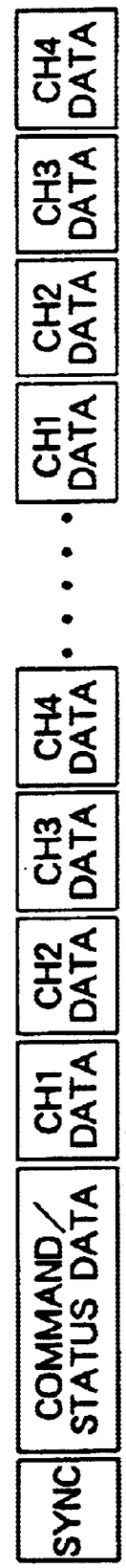
FIG. 9 is a view of the configuration of a data stream transmitted between the audio and/or video editing apparatus and the audio and/or video data recording and reproducing apparatus in the audio and/or video editing system shown in FIG. 7.

FIG. 9 is a view of the configuration of the data stream transmitted between the audio and/or video editing apparatus 64 and the audio and/or video data recording and reproducing apparatus 5 in the audio and/or video editing system 6 shown in FIG. 7.

Between the audio and/or video editing apparatus 64 and the audio and/or video data recording and reproducing apparatus 5, for example, as shown in FIG. 9, a data stream in which the synchronization data (SYNC), the control data (command data) used for controlling the audio and/or video data recording and reproducing apparatus 5 by the audio and/or video editing apparatus 64, or the status data used for indicating the state etc. of the apparatus by the audio and/or video data recording and reproducing apparatus 5 with respect to the audio and/or video editing apparatus 64, and the plurality of channels (4 channels (CH1, CH2, CH3 and CH4) of audio and/or video data corresponding to the number of the disk devices 520a, 520c, 520e, and 520g in FIG. 9) are multiplexed is transmitted.

The audio and/or video editing apparatus 64 controls the audio and/or video data recording and reproducing apparatus 5, makes this reproduce the audio and/or video data, receives the same, performs the editing, outputs the audio and/or video data after the editing to the audio and/or video data recording and reproducing apparatus 5, and makes this record the audio and/or video data.

In the audio and/or video data recording and reproducing apparatus 5 (FIG. 7 and FIG. 8), the disk array controller 50 records the data blocks 0, 1, . . . of the audio and/or video data input from the audio and/or video editing apparatus 64 in the individual hard disk drives 522a to 522h of the disk devices 520a, 520c, 520e, and 520g in an overlapped manner as shown in FIG. 7 under the control of the audio and/or video editing apparatus 64.

Further, where no obstacle occurs in the hard disk drives 520a, 520c, 520e, and 520g, the disk array controller 50 makes the hard disk drives 522a, 522c, 522e, and 522g of the hard disk drives 520a, 520c, 520e, and 520g reproduce the audio and/or video data for which the reproduction is requested by the audio and/or video editing apparatus 64 and outputs the same to the audio and/or video editing apparatus 64.

Further, where an obstacle occurs in the disk devices 520a, 520c, 520e, and 520g, the disk array controller 50 displays this by transmitting the status data indicating the occurrence of the obstacle to the audio and/or video editing apparatus 64 similar to the disk array controller 20 (FIG. 4) of the audio data recording and reproducing apparatuses 2a to 2d and, at the same time, makes one of the two hard disk drives of each of the disk devices 520a, 520c, 520e, and 520g, in which the obstacle is not generated reproduce the audio and/or video data for which the reproduction is requested by the audio and/or video editing apparatus 64, and outputs the same to the audio and/or video editing apparatus 64.

In the audio and/or video data recording and reproducing apparatus 5 (FIG. 8), the write use data controller 538 demultiplexes the command data from the data stream by using the synchronization data contained in the data stream (FIG. 9) input from the audio and/or video editing apparatus 64 via the S/P circuit 626, outputs the same to the control unit 530 via the command use FIFO 536, demultiplexes each channel of the audio and/or video data, and outputs the same to the main data multiplexer 528.

The read use data controller 534 operates in synchronization with the reception timing of the synchronization data of the data stream (FIG. 9) input from the audio and/or video editing apparatus 64, multiplexes each channel of the audio and/or video data input from the main data multiplexer 528 and status data input from the control unit 530 via the status use FIFO 532 on the data stream shown in FIG. 9, adds the synchronization data, and outputs the same to the audio and/or video editing apparatus 64 via the P/S circuit 620.

The control unit 530 detects the status of each constituent part of the audio and/or video data recording and reproducing apparatus 5 (existence of obstacle etc.) and generates the status data, outputs the same to the data controller 534 via the status use FIFO 532, and controls the constituent parts of the audio and/or video data recording and reproducing apparatus 5 based on the command data input from the data controller 538 via the command use FIFO 536 and status of the constituent parts of the audio and/or video data recording and reproducing apparatus 5 detected.

The main data multiplexer 528 operates in synchronization with the reception timing of the synchronization data of the data stream (FIG. 9) input from the audio and/or video editing apparatus 64 and outputs each of the first channel to the fourth channel of the audio and/or video data input via the data controller 538 to each of the data multiplexers 526a, 526c, 526e, and 526g. Further, the main data multiplexer 528 outputs the first channel to the fourth channel of the audio and/or video data input from the data multiplexers 526a, 526c, 526e, and 526g to the data controller 534.

The data multiplexers 526a, 526c, 526e, and 526g operate in synchronization with the reception timing of the synchronization data of the data stream (FIG. 9) input from the audio and/or video editing apparatus 64 and respectively record the first channel to the fourth channel of the audio and/or video data input from the main data multiplexer 528 in the hard disk drives 522a to 522h of the disk devices 520a, 520c, 520e, and 520g via respectively corresponding SCSI circuits 524a to 524h in an overlapped manner as mentioned above. Further, the data multiplexers 526a, 526c, 526e, and 526g receive the first channel to the fourth channel of the audio and/or video data reproduced by the hard disk drives 522a to 522h of the corresponding disk devices 520a, 520c, 520e, and 520g via the SPC circuits 524a to 524h and output the same to the corresponding data multiplexers 526a, 526c, 526e, and 526g.

The SPC circuits 524a to 524h perform the SCSI protocol control with the hard disk drives 522a to 522h and input and output the audio and/or video data between the data multiplexers 526a, 526c, 526e, and 526g and the hard disk drives 522a to 522h.

The disk devices 520a, 520c, 520e, and 520g operate in synchronization with the reception timing of the synchronization data of the data stream (FIG. 9) input from for example the audio and/or video editing apparatus 64, respectively record the audio and/or video data input from the data multiplexers 526a, 526c, 526e, and 526g in the hard disk drives 522a to 522h via the SPC circuits 524a to 524h, reproduce the recorded audio and/or video data, and output the same to the data multiplexers 526a, 526c, 526e, and 526g via the SPC circuits 524a to 524h.

First, an explanation will be made of the operation when the audio and/or video data are recorded in the audio and/or video data recording and reproducing apparatus 5 at the audio and/or video editing system 6.

The audio and/or video editing apparatus 64 multiplexes the command data indicating the start of the recording operation with respect to the audio and/or video data recording and reproducing apparatus 5 in the data stream shown in FIG. 9 and controls the audio and/or video data recording and reproducing apparatus 5 to make this start the recording operation. Further, the audio and/or video editing apparatus 64 multiplexes the data blocks 0, 1, . . . , 15 of the first channel to the fourth channel of the audio and/or video data in the data stream and outputs the same to the audio and/or video data recording and reproducing apparatus 5.

The disk array controller 50 of the audio and/or video data recording and reproducing apparatus 5 sequentially distributes the input data blocks 0, 4, . . . , 12 of the first channel of the audio and/or video data to the disk device 520a as shown in FIG. 7, distributes the data blocks 1, 5, . . . , 13 of the second channel of the audio and/or video data to the disk device 520b, distributes the data blocks 2, 6, . . . , 14 of the third channel of the audio and/or video data to the disk device 520a, distributes the data blocks 3, 7, . . . , 15 of the fourth channel of the audio and/or video data to the disk device 520d, and makes the hard disk drives 522a to 522h of the disk devices 520a, 520c, 520e, and 520g record the same in an overlapped manner.

That is, the disk device 520a records the first channel of the audio and/or video data in the hard disk drives 522a and 522b in an overlapped manner, the disk device 520c records the second channel of the audio and/or video data in the hard disk drives 522c and 522d in an overlapped manner, the disk device 520e records the third channel of the audio and/or video data in the hard disk drives 522e and 522f in an overlapped manner, and the disk device 520g records the fourth channel of the audio and/or video data in the hard disk drives 522g and 522h in an overlapped manner.

Next, an explanation will be made of the operation when the audio and/or video data are reproduced from the audio and/or video data recording and reproducing apparatus 5 in the audio and/or video editing system 6.

The audio and/or video editing apparatus 64 multiplexes the command data for making the audio and/or video data recording and reproducing apparatus 5 start the reproduction operation and for designating the audio and/or video data to be reproduced in the data stream shown in FIG. 9 and controls the audio and/or video data recording and reproducing apparatus 5 to make this start the reproduction operation.

The disk array controller 50 of the audio and/or video data recording and reproducing apparatus 5 selects the disk device recording the channel of the audio and/or video data for which the reproduction is requested, changes the hard disk drive to be made to perform the reproduction operation in accordance with the existence of an obstacle similar to the audio editing system 4 (FIG. 3), reproduces the audio and/or video data for which the reproduction is requested by the audio and/or video editing apparatus 64, multiplexes the same with the status data generated by the control unit 530 to generate the data stream (FIG. 9), and outputs this to the audio and/or video editing apparatus 64.

By constituting the audio and/or video editing system 6 as shown in the third embodiment, the audio and/or video data and the control use data can be multiplexed on one cable and transmitted between the audio and/or video editing apparatus 64 and the audio and/or video data recording and reproducing apparatus 5. Accordingly, unlike the audio editing system 4 (FIG. 3), it is not necessary to provide the control interface for each of the disk devices of the mirror configuration, and therefore the simplification of the control processing, reduction of size of apparatus, and the lowering of costs are possible.

Further, the main data multiplexer 528 of the audio and/or video data recording and reproducing apparatus 5 are hard disk drives 522a to 522h etc. operate in synchronization with the data stream input from the audio and/or video editing apparatus 64, therefore the timing of recording and reproduction between the hard disk drives 522a to 522h synchronize. Accordingly, it is easy to bring the timings among a plurality of channels of audio and/or video data transmitted with the audio and/or video editing apparatus 64 into coincidence. Accordingly, the audio and/or video editing system 6 is preferred for the editing of a plurality of channels of the audio and/or video data and can improve the efficiency of the editing work of the editor using the audio and/or video editing system 6.

Further, the audio and/or video editing system 6 is constituted so that a plurality of disk devices having a mirror configuration are connected in parallel, and each of the plurality of channels of audio and/or video data is recorded in each of these disk devices.

Figure 10:
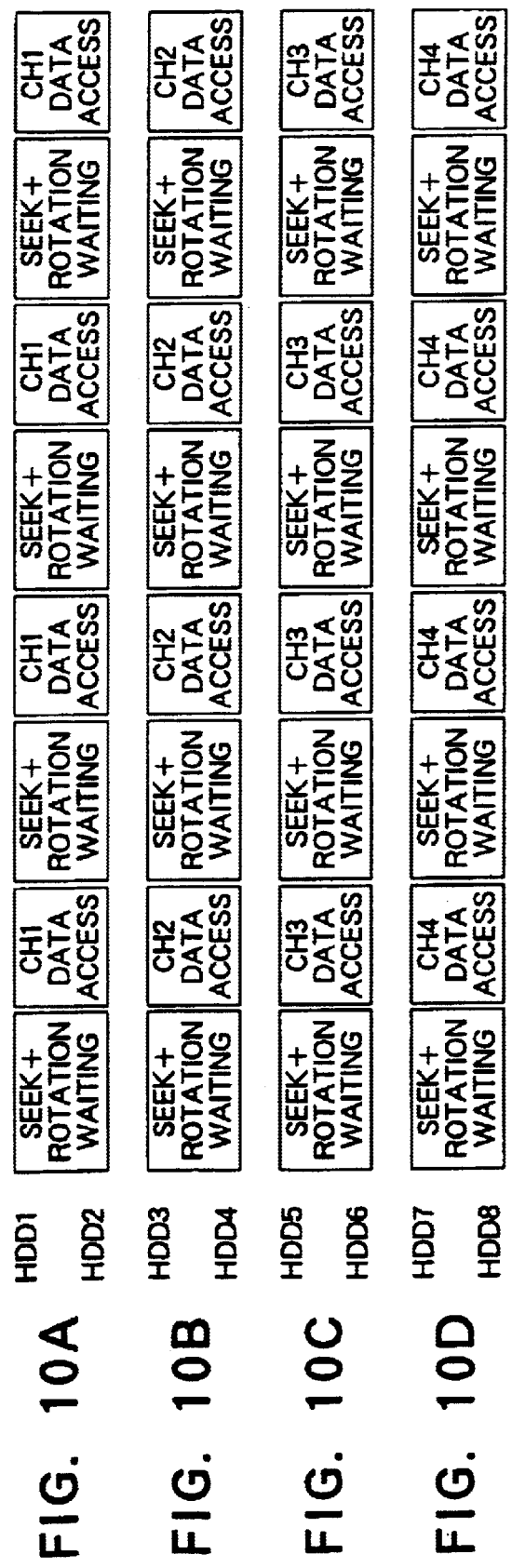
FIGS. 10A to 10D are views of a data access operation of the audio and/or video data recording and reproducing apparatus shown in FIG. 6.

Accordingly, unlike the audio and/or video data recording and reproducing apparatus 1 (FIG. 2) of the audio and/or video editing system 3 (FIG. 1), as shown in FIG. 10, in the audio and/or video data recording and reproducing apparatus 5, the access operation of each hard disk drive is independent.

That is, as shown in FIG. 10A to FIG. 10D, in the audio and/or video data recording and reproducing apparatus 5, when one channel of the audio and/or video data is recorded and reproduced, only one disk device performs the seek and rotation waiting with respect to the hard disk, therefore the seek time and the rotation waiting time become short in comparison with those of the hard disk drives 120a to 120i of the audio and/or video data recording and reproducing apparatus 1, and the efficiency of access with respect to the audio and/or video data is better. Further, in the audio and/or video editing system 6, the audio and/or video editing apparatus 64 and the audio and/or video data recording and reproducing apparatus 5 are connected by the transmission path of the same transmission data rate (270 Mbps) as that by the SDI system, and therefore the number of channels of audio and/or video data can be increased in comparison with the audio and/or video data recording and reproducing apparatus 1 connected by the SCSI system.

Further, similar to the audio data recording and reproducing apparatuses 2a to 2d (FIG. 4), the same data is recorded in two hard disk drives in an overlapped manner, therefore the reliability is high. That is, the audio and/or video data recording and reproducing apparatus 5 overcomes the problems of the audio and/or video data recording and reproducing apparatus 1 and audio data recording and reproducing apparatuses 2a to 2d while having their advantages.

Note that, the transmission system used between the audio and/or video editing apparatus 64 and the audio and/or video data recording and reproducing apparatus 5 may be another system having equivalent performances to those of the system shown in the third embodiment.

Further, the configuration of the data stream transmitted between the audio and/or video editing apparatus 64 and the audio and/or video data recording and reproducing apparatus 5 is not limited to that shown in FIG. 9. For example, other data (title of the audio and/or video data, data of time length, etc.) can be further multiplexed on the data stream too.

Further, modifications similar to those with respect to the audio and/or video editing system 3 and the audio editing system 4 are possible also with respect to the audio and/or video editing system 6.

Fourth Embodiment

Below, a fourth embodiment of the present invention will be explained.

In the fourth embodiment, an explanation will be made of an audio and/or video editing system 8 having a configuration of a plurality of audio and/or video data recording and reproducing apparatuses 5 shown in the third embodiment connected in parallel where a plurality of transmission paths of the SDI system can be accommodate.

Figure 11:
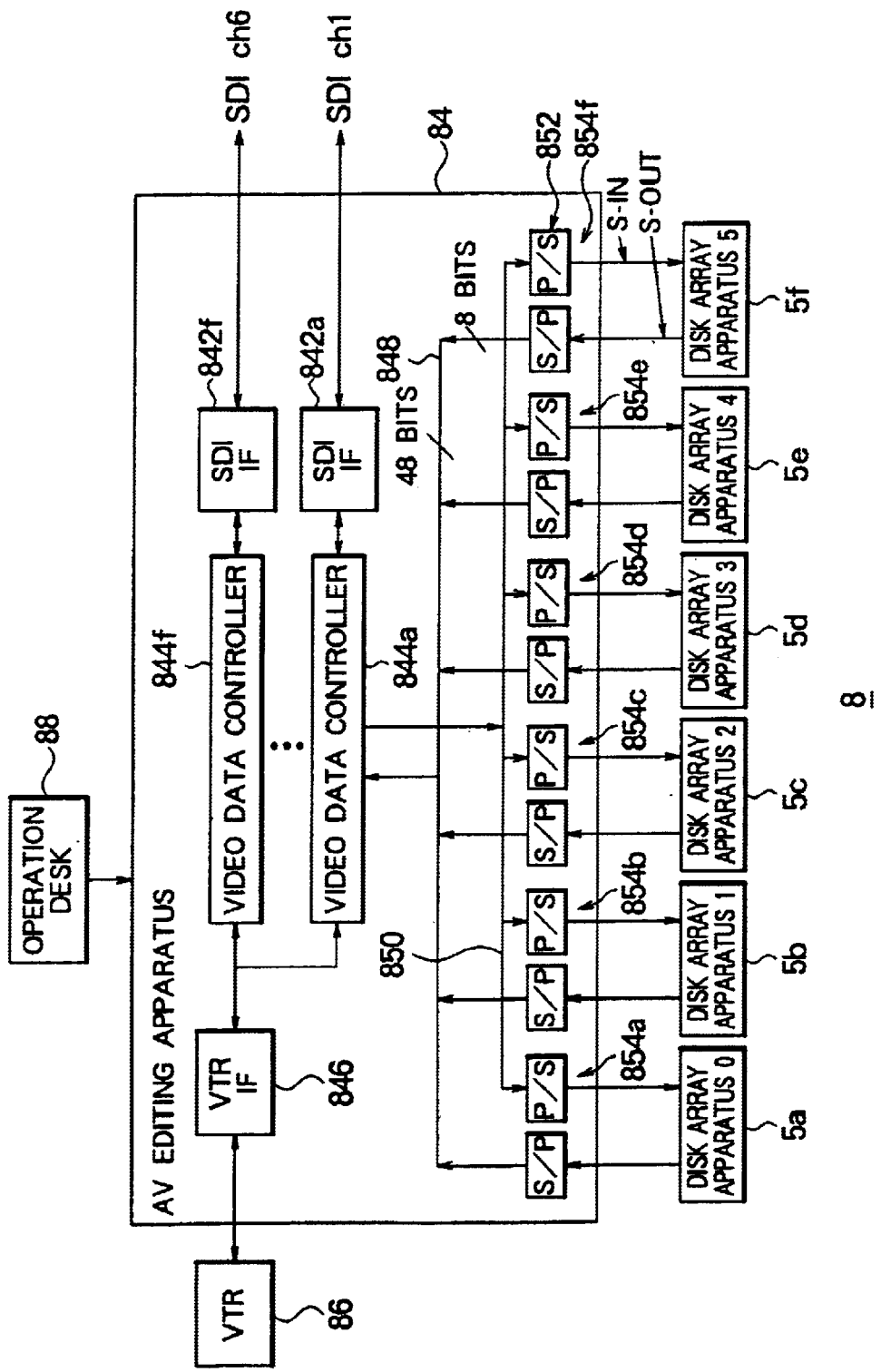
FIG. 11 is a view of the configuration of the audio and/or video editing system according to a fourth embodiment of the present invention.

FIG. 11 is a view of the configuration of the audio and/or vide editing system 8 according to the fourth embodiment of the present invention.

As shown in FIG. 11, the audio and/or video editing system 8 is constituted by an audio and/or video editing apparatus 84, a VTR apparatus 86, an operation desk 88, and six audio and/or video data recording and reproducing apparatuses 5a to 5f having the same configuration as that of the audio and/or video data recording and reproducing apparatus 5 (FIG. 7 and FIG. 8) corresponding to transmission paths (for example six paths) of the SDI system connected to the audio and/or video editing system 8. Between the audio and/or video data recording and reproducing apparatuses 5a to 5f and the audio and/or video editing apparatus 84, similar to for example the audio and/or video editing system 6 (FIG. 6), the data stream shown in FIG. 9 is transmitted via a transmission path of the same transmission rate (270 Mbps) as that of the SDI system.

The audio and/or video editing apparatus 84 is constituted by a VTR interface 846, video data controllers 844a to 844f, SDI interfaces 842a to 842f, and an interface unit 852. The interface unit 852 is constituted by serial interfaces 854a to 854f respectively corresponding to the audio and/or video data recording and reproducing apparatuses 5a to 5f and containing the P/S circuit 620 and the S/P circuit 626 (FIG. 8).

In the audio and/or video editing system 8, the SDI interfaces 842a to 842f respectively receive the data streams input from the transmission paths of the SDI system (SDI CH1 to CH6), demultiplex the audio and/or video data contained in the received data streams, and output the same to the video data controllers 844a to 844f. Further, the SDI interfaces (SDI IF) 842a to 842f respectively multiplex the audio and/or video data input from the video data controllers 844a to 844f on the data stream of the SDI system and transmit the same to the transmission paths CH1 to CH6 of the SDI system.

The operation desk 88 accepts the operation data indicating the contents of the editing which should be executed by for example the audio and/or video editing apparatus 84 and outputs the same to the audio and/or video editing apparatus 84.

The video data controllers 844a to 844f respectively generate the command data used for controlling the audio and/or video data recording and reproducing apparatuses 5a to 5f in accordance with the operation data input from the operation desk 88 by the editor and output the same to the audio and/or video data recording and reproducing apparatuses 5a to 5f via the serial interfaces 854a to 854f of the interface unit 852.

Further, the video data controllers 844a to 844f respectively perform the processings in accordance with the status data input from the audio and/or video data recording and reproducing apparatuses 5a to 5f. Further, the video data controllers 844a to 844f respectively control the input and output of the audio and/or video data among the transmission paths CH1 to CH6 of the SDI system, audio and/or video data recording and reproducing apparatuses 5a to 5f and the VTR interface 846.

The serial interfaces 854a to 854f of the interface unit 852 respectively input and output the data streams (FIG. 9) containing the command data or status data and the audio and/or video data between the audio and/or video data recording and reproducing apparatuses 5a to 5f and the video data controllers 844a to 844f.

The VTR interface (VTR if) 846 controls the input and output of the audio and/or video data between the VTR apparatus 86 and the SDI interfaces 842a to 842f.

By constituting the audio and/or video editing apparatus 8 as explained above, the audio and/or video data supplied from the plurality of transmission paths CH1 to CH6 of SDI system and VTR apparatus 86 can be recorded in the audio and/or video data recording and reproducing apparatuses 5a to 5f, respectively.

Further, it is possible to edit the audio and/or video data recorded in the audio and/or video data recording and reproducing apparatuses 5a to 5f in the audio and/or video editing apparatus 84 and record the audio and/or video data obtained as the result of the editing in the recording and reproducing apparatuses 5a to 5f and the VTR apparatus 86.

Further, the audio and/or video data recorded in the audio and/or video data recording and reproducing apparatuses 5a to 5f can be respectively transmitted to the transmission paths CH1 to CH6 of the SDI system.

Further, the audio and/or video data recording and reproducing apparatuses 5a to 5f perform the parallel operation in synchronization with the reception timing of the synchronization data of the data stream (FIG. 9) input from the audio and/or video editing apparatus 84, therefore the control of the timing of the audio and/or video data among them is not necessary. Accordingly, the storage capacity of the buffer memory for matching the timing of the audio and/or vide data with the audio and/or video data recording and reproducing apparatuses 5a to 5f can be very small.

Further, each of the audio and/or video data recording and reproducing apparatuses 5a to 5f has the hard disk array as shown in FIG. 7 and FIG. 8, therefore the storage capacity of the entire audio and/or video editing system 8 is very large. Accordingly, the audio and/or video editing system 8 has a similar characteristic feature to that of the audio and/or video editing system 6 (FIG. 6), and in addition is more preferred for the editing of complex audio and/or video data or editing of the audio and/or video data of a long program in comparison with the audio and/or video editing system 6.

As mentioned above, the audio and/or video data recording and reproducing apparatus according to the present invention and the method of same are preferred for editing since the audio and/or video data are recorded in a recording apparatus capable of random access and any desired part of the recorded audio and/or video data can be reproduced.

Further, according to the audio and/or video data recording and reproducing apparatus according to the present invention and the method of same, the audio and/or video data can be recorded and reproduced with a high efficiency by making the access time when recording and reproducing the audio and/or video data with respect to the recording medium capable random access as short as possible.

Further, according to the audio and/or video data recording and reproducing apparatus according to the present invention and the method of same, a plurality of apparatuses are connected and complex editing with respect to the audio and/or video data can be performed with a high efficiency, and in addition, the physical connection of cable connections etc. can be reduced even in a case where a plurality of apparatuses are connected.

What is claimed is:

1. An audio and/or video data recording and reproducing apparatus, comprising:
   a receiving means for receiving an input data stream having command data and a plurality of channels including at least one channel of audio data and one channel video data time division multiplexed in a predetermined order;
   a demultiplexing means for demultiplexing said command data and each one of said plurality of channels of the received input data stream;
   a plurality of recording means for recording the plurality of demultiplexed channels, each one of said plurality of recording means configured to record exactly one of said plurality of channels so that random access is possible, wherein one of said plurality of recording means is configured to record exactly one of said plurality of channels;

a reproducing means for reproducing the recorded plurality of channels from said plurality of recording means based, at least in part, on said demultiplexed command data; and a multiplexing means for multiplexing the reproduced plurality of channels in said predetermined order and generating an output data stream, wherein each of said plurality of recording means adopts a mirror configuration having a plurality of recording apparatuses for recording the same audio and/or video data.

2. An audio and/or video data recording and reproducing apparatus, comprising:

a receiving means for receiving an input data stream having command data and a plurality of channels of at least one channel of audio data and one channel of video data being multiplexed in a predetermined order;

a demultiplexing means for demultiplexing said command data and each one of said plurality of channels from the received input data stream;

a plurality of recording means for recording the demultiplexed plurality of channels so that random access is possible, wherein one of said plurality of recording means is configured to record exactly one of said plurality of channels;

a reproducing means for reproducing the recorded plurality of channels from said plurality of recording means based on said demultiplexed command data; and a multiplexing means for multiplexing the reproduced plurality of channels in said predetermined order and generating an output data stream, wherein each of said plurality of recording means adopts an array configuration in which a plurality of recording apparatuses are connected in parallel.

3. An audio and/or video data recording and reproducing apparatus comprising:

a receiving means for receiving an input data stream having command data and a plurality of channels of at least one channel of audio data and one channel of video data being multiplexed in a predetermined order;

a demultiplexing means for demultiplexing said command data and each one of said plurality of channels from the received input data stream;

a plurality of recording means for recording the demultiplexed plurality of channels so that random access is possible, wherein one of said plurality of recording means is configured to record exactly one of said plurality of channels;

a reproducing means for reproducing the recorded plurality of channels from said plurality of recording means;

a multiplexing means for multiplexing the reproduced plurality of channels in said predetermined order and generating an output data stream; and a recording and reproduction control means for controlling a recording operation of said plurality of recording means and a reproduction operation of said reproducing means based on control data, wherein said input data stream includes multiplexed control data, wherein said demultiplexing means further demultiplexes said, control data from the received input data stream wherein said recording and reproducing control means controls said recording means recording said demultiplexed channels using said demultiplexed command data, and wherein said recording and reproducing control means controls said reproducing means reproducing the recorded plurality of channels based on said demultiplexed command data.

4. An audio and/or video data recording and reproducing apparatus according to claim 3, wherein:

at least one of said plurality of recording means further performs said recording operation in synchronization with a synchronization signal of the received input data stream; and said reproducing means further performs said reproduction operation in synchronization with said synchronization signal.

5. An audio and/or video data recording and reproducing apparatus according to claim 4, further comprising:

a plurality of audio and/or video data recording and reproducing apparatuses being connected in parallel, wherein said input data stream and said output data stream are input and output among said plurality of audio and/or video data recording and reproducing apparatuses.

6. An audio and/or video data recording and reproduction method, comprising the steps of:

receiving an input data stream having command data and a plurality of channels of at least one of audio data and one channel of video data being multiplexed in a predetermined order;

demultiplexing said command data and each one of said plurality of channels from the received input data stream;

recording the demultiplexed plurality of channels so that random access is possible, wherein one of said plurality of channels is recorded on exactly one of a plurality of recording means for recording;

reproducing the recorded plurality of channels from said plurality of recording means based on said demultiplexed command data; and multiplexing the reproduced plurality of channels in said predetermined order and generating an output data stream, wherein the demultiplexed plurality of channels is duplicated on more than one recording medium to perform backup of the demultiplexed plurality of channels.

7. An audio and/or video data recording and reproduction method according to claim 6, wherein:

the demultiplexed each one of said plurality of channels is recorded in parallel with the rest of said plurality of channels on a plurality of recording media.

8. An audio and/or video data recording and reproducing apparatus, comprising:

an input circuit configured to receive an input data stream having command data and a plurality of channels of at least one channel of audio data and one channel of video data being multiplexed in a predetermined order;

a data controller circuit configured to demultiplex of said plurality of channels from the received input data stream;

a plurality of disk drives configured to record the demultiplexed plurality of channels so that random access is possible, wherein one of said plurality of disk drives is configured to record exactly one of said plurality of channels, and wherein at least one of said plurality of disk drives is further configured to reproduce the recorded each of from said plurality of disk drives based on said demultiplexed command data; and a multiplexer circuit configured to multiplex the reproduced of said plurality of channels in said predetermined order and to generate an output data stream, wherein each of said plurality of disk drives adopts a mirror configuration having a plurality of recording apparatuses for recording the same audio and/or video data.

9. An audio and/or video data recording and reproducing apparatus, comprising:

an input circuit configured to receive an input data stream having command data and a plurality of channels of at least one channel of audio data and one channel of video data being multiplexed in a predetermined order;

a data controller circuit configured to demultiplex said command data and each one of said plurality of channels from the received input data stream;

a plurality of disk drives configured to record the demultiplexed plurality of channels so that random access is possible, wherein one of said plurality of disk drives is configured to record exactly one of said plurality of channels, and wherein at least one of said plurality of disk drives is further configured to reproduce the recorded each one from said plurality of disk drives based on demultiplexed command data; and a multiplexer circuit configured to multiplex the reproduced each one in said predetermined order and to generate an output data stream, wherein each of said plurality of disk drives adopts an array configuration in which a plurality of recording apparatuses are connected in parallel.

10. An audio and/or video data recording and reproducing apparatus comprising:

an input circuit configured to receive an input data stream having command data and a plurality of channels of at least one of audio data and one channel of video data being multiplexed in a predetermined order;

a data controller circuit configured to demultiplex said command data and each one of said plurality of channels from the received input data stream;

a plurality of disk drives configured to record the demultiplexed each one so that random access is possible, wherein one of said plurality of disk drives is configured to record exactly one of said plurality of channels, and wherein at least one of said plurality of disk drives is further configured to reproduce the recorded each one from said plurality of disk drives;

a multiplexer circuit configured to multiplex the reproduced each one in said predetermined order and to generate an output data stream; and a control circuit configured to control a recording operation of said plurality of disk drives and a reproduction operation of said at least one disk drive based on control data, wherein said input data stream includes multiplexed control data, wherein said data controller circuit is further configured to demultiplex said control data from the received input data stream; and wherein said control circuit controls the recording operations and reproducing operation based on said demultiplexed control data.

11. An audio and/or video data recording and reproducing apparatus according to claim 10, wherein:

one or more of said plurality of disk drives are further configured to perform said recording operation in synchronization with a synchronization signal of the received input data stream; and said at least one disk drive is further configured to perform said reproduction operation in synchronization with said synchronization signal.

12. An audio and/or video data recording and reproducing apparatus according to claim 11, further comprising:

a plurality of audio and/or video data recording and reproducing apparatuses being connected in parallel, wherein said input data stream and said output data stream are input and output among said plurality of audio and/or video data recording and reproducing apparatuses.

* * * * *